United States Patent
Zhu et al.

(10) Patent No.: US 9,642,034 B2
(45) Date of Patent: May 2, 2017

(54) SYSTEMS, METHODS, AND DEVICES TO SUPPORT INTRA-QCI QOS-AWARE RADIO RESOURCE ALLOCATION

(71) Applicant: INTEL CORPORATION, Santa Clara, CA (US)

(72) Inventors: Jing Zhu, Portland, OR (US); Yi Gai, Hillsboro, OR (US); Rath Vannithamby, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 71 days.

(21) Appl. No.: 14/227,775

(22) Filed: Mar. 27, 2014

(65) Prior Publication Data

US 2015/0281999 A1    Oct. 1, 2015

(51) Int. Cl.
| | |
|---|---|
| H04W 4/00 | (2009.01) |
| H04W 28/02 | (2009.01) |
| H04W 28/12 | (2009.01) |
| H04L 12/851 | (2013.01) |
| H04W 72/12 | (2009.01) |

(52) U.S. Cl.
CPC ..... *H04W 28/0268* (2013.01); *H04L 47/2441* (2013.01); *H04W 28/12* (2013.01); *H04W 72/1236* (2013.01); *H04W 72/1242* (2013.01)

(58) Field of Classification Search
CPC ......... H04W 28/0268; H04W 72/1226; H04W 72/1242
See application file for complete search history.

(56) References Cited

U.S. PATENT DOCUMENTS

| | | | |
|---|---|---|---|
| 2010/0265823 A1 | 10/2010 | Zhao et al. | |
| 2011/0176531 A1* | 7/2011 | Rune | H04W 76/041 370/338 |

(Continued)

FOREIGN PATENT DOCUMENTS

| | | | | |
|---|---|---|---|---|
| KR | 1020120074015 | | 7/2012 | |
| WO | WO 2013123467 A1 * | | 8/2013 | ........ H04W 28/0268 |

OTHER PUBLICATIONS

3GPP TS 23.203, "Technical Specification Group Services and System Aspects; Policy and charging control architecture (Release 10)", V10.6.0, Mar. 2012, 130 pages.

(Continued)

*Primary Examiner* — Derrick Ferris
*Assistant Examiner* — Farhad Ali
(74) *Attorney, Agent, or Firm* — Stoel Rives LLP

(57) ABSTRACT

Systems and methods to support intra-quality of service (QoS) class identifier (QCI) QoS-aware scheduling are disclosed herein. User equipment (UE) may be configured to communicatively couple to an Evolved Universal Terrestrial Radio Access Network (E-UTRAN) Node B (eNB). The eNB may schedule packets within a QCI according to information provided to the eNB by the UE. Packets in a QCI may be classified into one or more flows using the information. The flows may be prioritized based on which are most important to the UE. The UE may provide QoS parameters for each flow. The eNB may be schedule packets based on which flow each packet is in and the QoS parameters for that flow. The associated QoS parameters may be prioritized, and more important QoS parameters may be met to the detriment of less important QoS parameters.

22 Claims, 7 Drawing Sheets

(56) References Cited

U.S. PATENT DOCUMENTS

2012/0099416 A1    4/2012  Bekiares et al.
2012/0243462 A1    9/2012  Bucknell et al.
2012/0314568 A1   12/2012  Tan et al.
2013/0242887 A1    9/2013  Zhu et al.

OTHER PUBLICATIONS

3GPP TS 29.281, "LTE; General Packet Radio System (GPRS) Tunnelling Protocol User Plane (GTPv1-U) (Release 11)", V11.6.0, Apr. 2013, 29 pages.
PCT/US2015/017753, International Search Report and Written Opinion, May 29, 2015, 17 pages.

* cited by examiner

| QCI 310 | Direction 320 | Priority 330 | Classification Information 340 | QoS Type 350 | QoS Value 360 | QoS Priority 370 |
|---|---|---|---|---|---|---|
| Default Bearer Non-privileged Subscribers Real-Time Application | DL | 1 | TCP Ports 100-199 | Delay 351 | 300 ms 361 | 1 371 |
| | | | | Throughpath 352 | .2 Mbps 362 | 2 372 |
| | | | | Loss Rate 353 | 10⁻⁵ 363 | 3 373 |

FIG. 3

SYSTEMS, METHODS, AND DEVICES TO SUPPORT INTRA-QCI QOS-AWARE RADIO RESOURCE ALLOCATION

TECHNICAL FIELD

The present disclosure relates to intra-QCI QoS-aware communications between one or more devices and a base station.

BRIEF DESCRIPTION OF THE DRAWINGS

FIG. 3 is a schematic diagram of a set of information that may be utilized when providing intra-QCI QoS-aware scheduling.

DETAILED DESCRIPTION OF PREFERRED EMBODIMENTS

Figure 1:
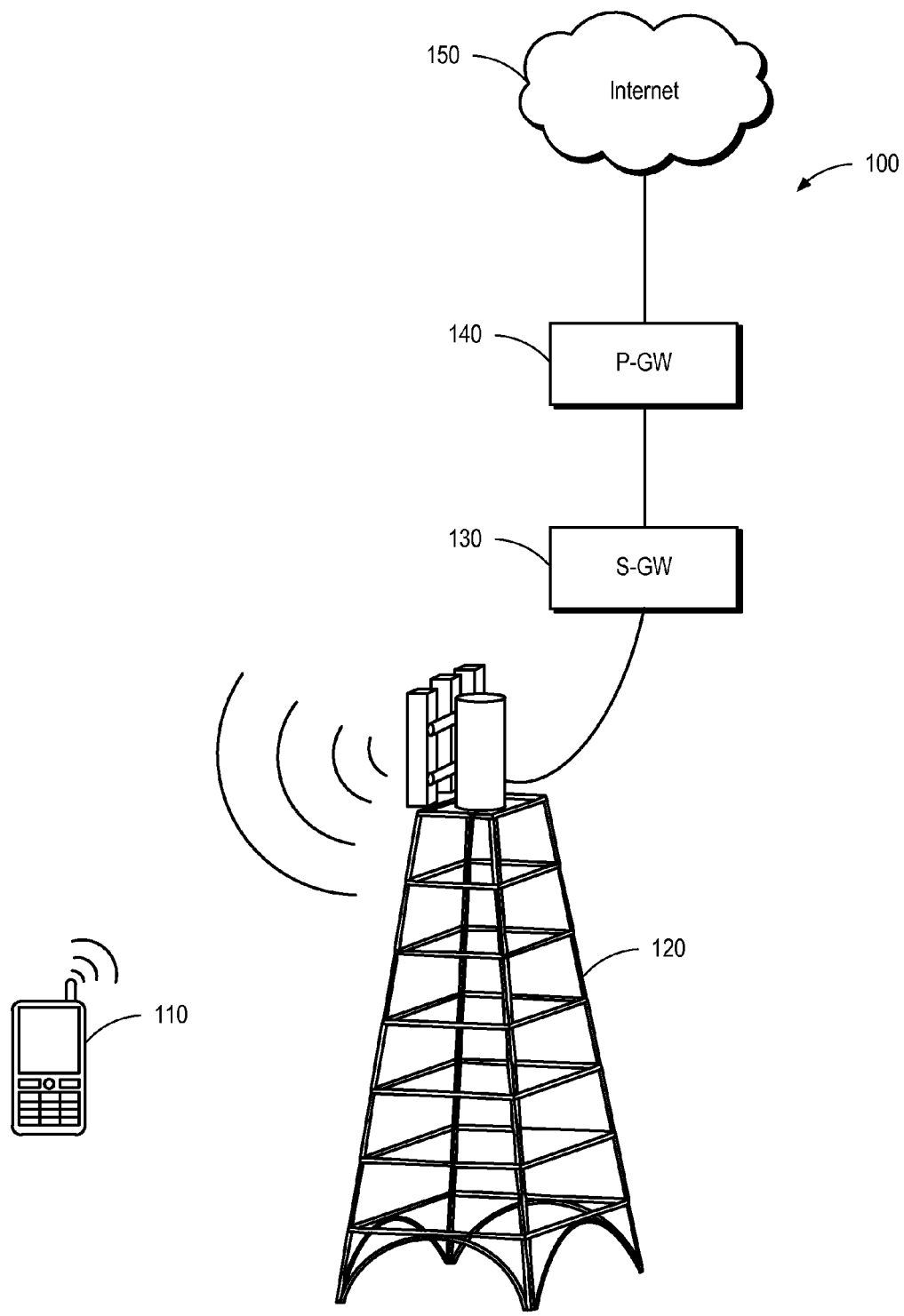
FIG. 1 is a schematic diagram of a system for communicatively coupling a UE to the Internet.

Wireless mobile communication technology uses various standards and protocols to transmit data between a base station and a wireless communication device. Wireless communication system standards and protocols can include, for example, the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, a base station may include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE). An evolved packet core (EPC) may communicatively couple the E-UTRAN to an external network, such as the Internet.

LTE networks include radio access technology and core radio network architecture that provide high data rate, low latency, packet optimization, and improved system capacity and coverage. In LTE networks, an E-UTRAN may include a plurality of eNodeBs and may communicate with a plurality of UEs. A downlink (DL) transmission in a LTE network can be defined as a communication from the eNodeB to a UE, and an uplink (UL) transmission can be defined as a communication from the UE to the eNodeB.

When a UE communicatively couples with an E-UTRAN, an evolved packet system (EPS) bearer may be established for the UE. The EPS bearer may be a virtual coupling between the UE and a packet gateway (P-GW) and may be comprised of additional bearers (e.g., an E-UTRAN radio access bearer (E-RAB), a radio bearer, an S1 bearer, an S5/S8 bearer, etc.). The EPS bearer may include a guaranteed quality of service (QoS). For example, each EPS bearer may be associated with a QoS class identifier (QCI), and each QCI may be associated with predefined QoS parameters. The QCI QoS parameters may include priority, packet delay budget, packet error/loss rate, resource type, whether a bit rate is guaranteed, and/or the like. Data packets from different EPS bearers may be treated differently based on the QCI associated with each EPS bearer, but traffic within EPS bearers may be treated equally.

A UE may be running many different applications, including 3rd party applications, but all the traffic from these applications may be assigned to a same bearer. For example, QCI "9" may be a default bearer for non-privileged subscribers, such as the 3rd party applications. Data from the 3rd party applications may be delivered Over-The-Top (OTT) using the default bearer. Sometimes, the data may be encrypted, so the E-UTRAN and/or EPC may not even be able to determine the contents on communicated packets. The applications may have different QoS requirements but may be subject to the same QoS treatment. For example, a Real-Time application, such as Skype, FaceTime, Google Hangouts, etc., may have different QoS requirements (e.g., delay, throughput, packet loss, etc.) than non-Real-Time applications (e.g., web-browsing, etc.), background applications (e.g., updates, etc.), and/or the like. Thus, 3rd party applications on the UE may experience less than ideal performance. Accordingly, there is a need for systems and methods for providing different QoS treatment to packets for different services (e.g., different OTT applications) within a same bearer associated with a single QCI.

In an embodiment, intra-QCI classification of data may allow an eNB and/or a UE to provide different QoS treatment to packets in a same bearer with a single QCI. The data may be classified into a plurality of flows that each have associated QoS parameters. The eNB and/or UE may provide the QoS treatment to each flow that is specified by the QoS parameters. A real-time flow may receive a smaller delay but higher packet loss than a non-real time flow that requires a lower packet loss but can accept a larger delay. Certain flows may be more or less important to the UE, so the QoS parameters may specify the priorities for the flows. Packets from higher priority flows may receive better treatment than packets from lower priority flows. Scheduling based on the intra-QCI QoS parameters may not affect scheduling of packets associated with other QCIs and/or scheduling for other UEs in some embodiments.

Intra-QCI QoS-aware scheduling may be implemented in systems designed to be interoperable with standards and protocols that do not support intra-QCI scheduling. An eNB supporting intra-QCI QoS-aware scheduling may thus transmit a radio resource control (RRC) message indicating that intra-QCI QoS-aware scheduling is supported. The eNB may only support intra-QCI QoS-aware scheduling for certain QCIs, so the eNB may indicate for which QCIs intra-QCI QoS-aware scheduling is supported. A UE may receive the RRC message. If the UE does not support intra-QCI QoS-aware scheduling, it may disregard the RRC message. If the UE does support intra-QCI QoS-aware scheduling, it may decide whether or not it wants intra-QCI QoS-aware scheduling to be activated.

To activate intra-QCI QoS-aware scheduling, the UE may transmit an RRC message to the eNB indicating that intra-QCI QoS-aware scheduling should be activated. The RRC message from the UE may include various information. For example, the RRC message may indicate which traffic should receive the intra-QCI QoS-aware scheduling. The RRC message may indicate whether UL traffic, DL traffic, or both should receive the intra-QCI QoS-aware scheduling. The RRC message may indicate the number of bearers that will be subject to intra-QCI QoS-aware scheduling and may identify each bearer, for example, using the QCI for that bearer. The RRC message may also indicate how many flows there are going to be and/or classification information for identifying each flow. The classification information may include Internet Protocol (IP) addresses, port numbers, protocol types, and/or the like, and/or there may be a default flow for packets that cannot be classified using the classification information. The RRC message may indicate a priority of each flow, for example, using one or more integer numbers. The priority may indicate which flow(s) are more important to the UE and should therefore receive better treatment during scheduling.

The RRC message may include QoS parameters for each flow and may indicate the number of QoS parameters per flow. For each QoS parameter, a type, value, and priority may be indicated. The type may indicate what parameter is being specified. The type may include tolerable delay, minimum throughput, maximum packet loss rate, and/or the like. The value may indicate what the limit is for the indicated parameter type, such as 10 ms delay, 10 kBps throughput, 1% packet loss rate, and/or the like. Units may be assumed and/or may be indicated in the RRC message. A special value (e.g., 0, −1, etc.) may indicate that the type has no explicit limit. The priority may indicate which type of QoS parameter is most important to the UE. The eNB and/or UE may not be able to satisfy every type of QoS parameter in some situations. In such situations, the eNB and/or UE may attempt to meet higher priority types of QoS parameters at the expense of lower priority types. The QoS parameter priority therefore allows the UE to indicate to the eNB what type of treatment will give the best experience to a user. Trading off between different types of QoS parameters may be performed in addition to trading off between flows and/or instead of trading off between flows (e.g., less important QoS parameters may be sacrificed to meet more important QoS parameters without impacting other flows in the same EPS bearer).

In response to receiving the RRC message, the eNB may activate the intra-QCI QoS-aware scheduling. Alternatively, or in addition, the UE may activate the intra-QCI QoS-aware scheduling after transmitting the RRC message, after receiving an acknowledgement, and/or without transmitting an RRC message. The eNB and/or UE may use the classification information to identify to which flow each packet should be assigned. The eNB and/or UE may schedule packets based on the flow to satisfy as many of the QoS parameters for that flow as possible. In some embodiments, the scheduling may be performed entirely by the eNB, so the UE may not need to be aware of which algorithm is being used. The UE can communicate with eNBs implementing various different algorithms without any complicated changes to the design of the UE. For example, various eNB providers may use their own proprietary scheduling algorithms. The scheduled packets may be transmitted by the eNB and received by the UE and/or vice versa.

The applications running on the UE may change over time. One or more flows may stop receiving traffic, and/or new traffic without a corresponding flow may start (e.g., a new application may be launched on the UE). To account for such changes, the UE may send an RRC message to the eNB with updated intra-QCI QoS-aware scheduling information. The RRC message may include only the updated information and/or may include a complete set of information. RRC messages with updates to the intra-QCI QoS-aware scheduling information may be transmitted periodically (e.g., regardless of whether a change has occurred), in response to determining a change has occurred, and/or the like. After the eNB has received the updated intra-QCI QoS-aware scheduling information, the eNB and/or UE may schedule packets according to the updated information. Alternatively, or in addition, the UE may scheduling packets according to updated intra-QCI QoS-aware scheduling information without transmitting the updated information to the eNB. The UE may wish to deactivate the intra-QCI QoS-aware scheduling, for example, because a user has closed one or more applications. To do so, the UE may transmit an RRC message to the eNB indicating that the intra-QCI QoS-aware scheduling should be deactivated. In response, the eNB and/or UE may deactivate the intra-QCI QoS-aware scheduling and may return to scheduling packets according to a default method of scheduling. The RRC message may deactivate fewer than all flows in some embodiments and/or may completely deactivate the intra-QCI QoS-aware scheduling. The default method of scheduling may be a first-in-first-out (FIFO) algorithm and/or another algorithm that treats intra-QCI traffic equally.

FIG. 1 is a schematic diagram of a system 100 for communicatively coupling a UE 110 to the Internet 150. An eNB 120 may be wirelessly communicatively coupled with the UE 110, which may allow mobile use of the UE 110 by a user while still remaining communicatively coupled to the Internet. The eNB 120 may be communicatively coupled to a switching gateway (S-GW) 130, which may be communicatively coupled to a P-GW 140. The P-GW 140 may be communicatively coupled to the Internet 150. The S-GW 130 and P-GW 140 may be responsible for routing packets from the eNB 120 to the Internet 150 and vice-versa. An EPS bearer (not shown) may be established between the UE 110 and the P-GW 140. The EPS bearer may guarantee a certain QoS for packets carried between the UE 110 and the P-GW 140.

The UE 110 may be a smart phone, a tablet, a modem coupled to a laptop or personal computer, and/or the like. Various applications, such as computer programs, mobile applications, and/or the like, may be executed on the UE 110. The various applications may communicate with the Internet 150 through the eNB 120, S-GW 130, and/or P-GW 140. The UE 110 may assign applications to EPS bearers. Some of the applications may be 3rd party applications and may be assigned to a default EPS bearer. The EPS bearer may be a virtual concept that ensures that packets are correctly routed from the applications to the internet and vice versa and receive a predefined QoS treatment. For example, the eNB 120, S-GW 130, and/or P-GW 140 may schedule packets based on the particular EPS bearer with which they are associated.

Figure 2:
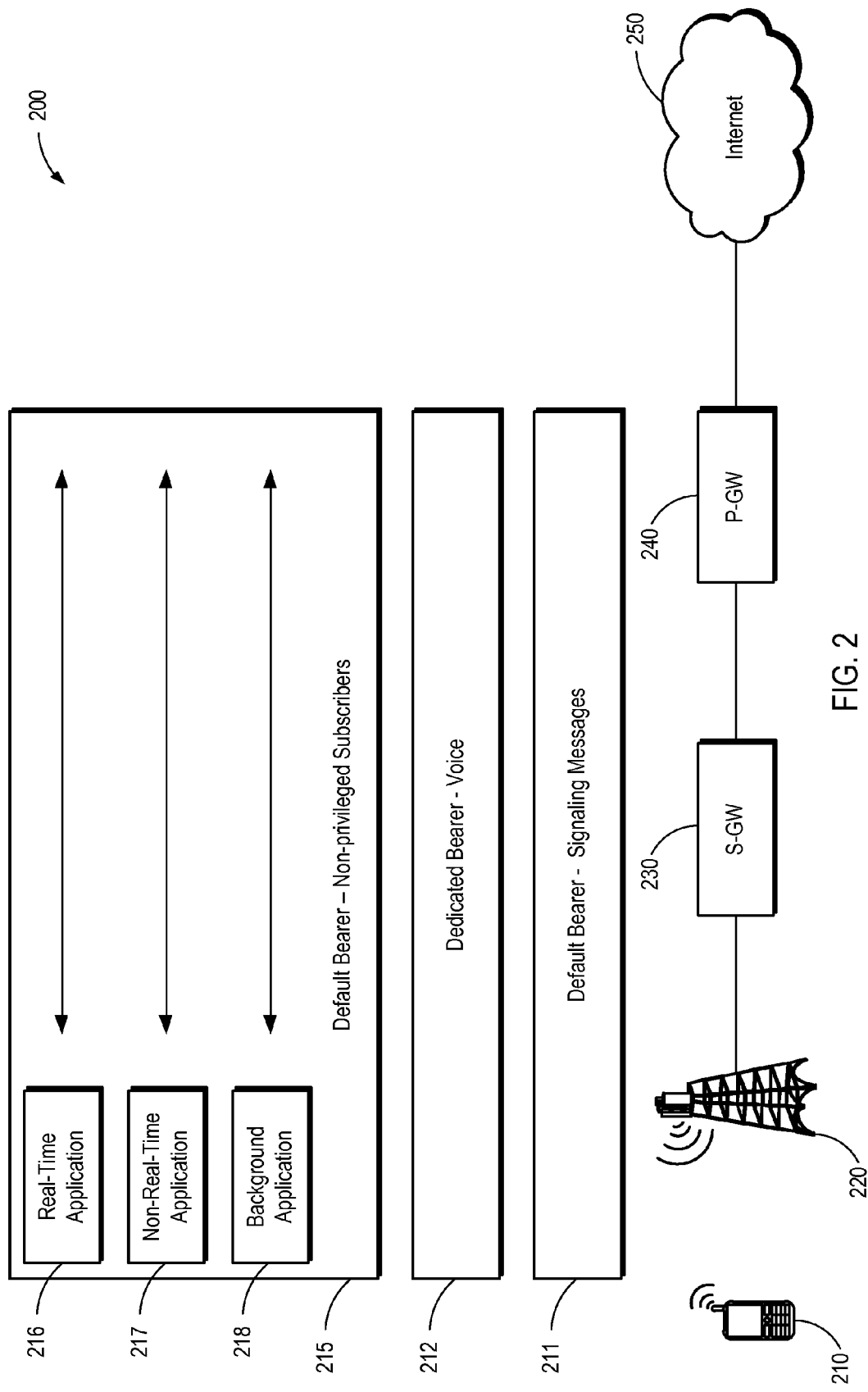
FIG. 2 is a schematic diagram of a system for communicatively coupling a UE to the Internet using a plurality of bearers.

FIG. 2 is a schematic diagram of a system 200 for communicatively coupling a UE 210 to the Internet 250 using a plurality of bearers 211, 212, 215. When the UE 210 communicatively couples with the E-UTRAN (e.g., by coupling to the eNB 220), a default EPS bearer 211 may be established between the UE 210 and the P-GW 240. In an embodiment, the default bearer 211 may be configured to carry signaling messages (e.g., Session Initiation Protocol (SIP) signaling messages). The default bearer 211 for signaling messages may receive a predefined QoS treatment based on a QCI associated with the default bearer 211. For example, the default bearer 211 may be guaranteed a low delay and small packet loss. The eNB 220, S-GW 230, and/or P-GW 240 may ensure the QoS requirements are met. The UE 210 may request that dedicated bearers and/or additional default bearers be established. The UE 210 may request that a dedicated bearer 212 for carrying voice be established. The dedicated bearer 212 for voice may be configured to transport voice over IP (VoIP) packets, for example, to provide telephone service to the UE 210. The dedicated bearer 212 may be guaranteed low delay but may be need to accept high packet loss in some embodiments.

The UE 210 may request that an additional default bearer 215 be established for transporting packets from non-privileged subscribers. For example, the UE 210 may be running a plurality of applications, such as a real-time application 216, a non-real-time application 217, and a background application 218. The plurality of applications 216-218 may all receive access to the Internet 250 via the default bearer 215 for non-privileged subscribers. When intra-QCI QoS-aware scheduling is not active, the plurality of applications 216-218 may receive equal QoS treatment. Thus, an application requiring low packet delay but willing to accept low throughput may experience the same packet delay and throughput as an application requiring high throughput but willing to accept high packet delay. Moreover, some applications may be more important than others to a user of the UE 210, but packets from the more important applications may not receive any better QoS treatment. For example, all packets in the default bearer 215 may receive FIFO or similar treatment.

When intra-QCI QoS-aware scheduling has been activated, the packets from the plurality of applications 216-218 may receive different QoS treatment within the default bearer 215. Packets from more important applications may receive higher priority and scheduling may attempt to accommodate the most important QoS parameters before the least important QoS parameters. Alternatively, or in addition, scheduling may be optimized for the more important QoS parameters at the expense of the least important QoS parameters and/or may not affect the packets of other applications using the same default bearer 215. The intra-QCI scheduling for packets in the default bearer 215 may not affect the scheduling of packets in the other bearers 211, 212 and/or bearers of other users (not shown) in some embodiments. The intra-QCI scheduling may be performed by the UE 210 and/or the eNB 220. In some embodiments, the S-GW 230, the P-GW 240, etc. may also, or instead, perform intra-QCI scheduling. For example, the UE 210 may schedule UL packets before transmission to the eNB 220, and/or the eNB 220 may schedule DL packets before transmission to the UE 210. Some or all of the applications 216-218 may be using a protocol configured to adjust packet transmission rate in response to the QoS performance experienced by transmitted packets. Accordingly, the delaying or dropping of packets may cause the applications 216-218 and/or remote connections to adjust packet transmission rates, which may improve the performance of other applications communicating via the default bearer 215.

FIG. 3 is a schematic diagram of a set of information 300 that may be utilized when providing intra-QCI QoS-aware scheduling. The set of information 300 may include an indication of a QCI 310 to which the intra-QCI QoS-aware scheduling should be applied. The indication of the QCI 310 may include an integer number identifying the QCI, a text identification of the QCI, a unique identifier for the QCI, and/or the like. One or more than one QCI may be indicated, and/or the set of information 300 may include an indication of the number of QCIs to which intra-QCI QoS-aware scheduling will be applied. The set of information 300 may include an indication of a traffic direction 320 to which the intra-QCI QoS-aware scheduling should be performed. For example, UL traffic, DL traffic, or traffic in both directions may be scheduled. In the illustrated embodiment, the indications of the QCI 310 and the traffic direction 320 may be indicated for a particular flow. Alternatively, or in addition, information about a plurality of flows may be indicated for each QCI and/or traffic direction to which the intra-QCI QoS-aware scheduling will be applied. The flows may be virtual concepts for determining how to allocate resources among packets.

The set of information 300 may include classification information 340 for identifying which traffic belongs in each flow. In the illustrated embodiment, the classification information 340 indicates traffic using a Transmission Control Protocol (TCP) and transmitted on ports 100-199 should be classified in the flow. The classification information may include, inter alia, source or destination IP addresses, source or destination ports, protocol types, and/or the like. Header information (e.g., information from an IP header, a TCP header, etc.) may be pulled from packets and compared with the classification information 340 to determine in which flow to classify each packet. The set of information 300 may include priority information 330 for each flow. The priority information 330 may include, e.g., an integer number, which may indicate an order of priority among the flows. Packets belonging to a flow with a higher priority may be prioritized during scheduling over packets belonging to a flow with a lower priority. Alternatively, or in addition, QoS parameters of higher priority flows may satisfied at the expense of QoS parameters of lower priority flows.

The set of information 300 may include QoS parameters and/or the number of QoS parameters per flow. The QoS parameters may include QoS type 350, QoS value 360, QoS priority 370, and/or the like for each QoS parameter. The QoS type 350 may include an indication of which criterion the QoS value 360 and/or QoS priority 370 are being specified for. The QoS type 350 may include the maximum tolerable delay 351, minimum throughput 352, maximum loss rate 353, and/or the like. The QoS value 360 may be the limit above or below which the criterion specified by the QoS type 350 should remain. For example, a maximum delay value 361 may be specified in milliseconds, a minimum throughput 362 may be specified in megabits per second, and/or a maximum loss rate 363 may be specified as a negative decimal exponent. The units may be predefined and/or the QoS value 360 may indicate the units to be used. The QoS priority 370 may indicate which QoS parameters are most important to the application and which are least important. For example, a real-time application may assign a highest priority 371 to the maximum delay 351, a second highest priority 372 to the minimum throughput 352, and a lowest priority 373 to a maximum loss rate 353. Packets delayed too much may be useless to the real-time application, but the real-time application may be able to gracefully degrade quality in response to increasing packet loss. Thus, the real-time application may offer a better user experience if the loss rate 353 is allowed to rise above the maximum value 363 rather than the delay 351.

Figure 4:
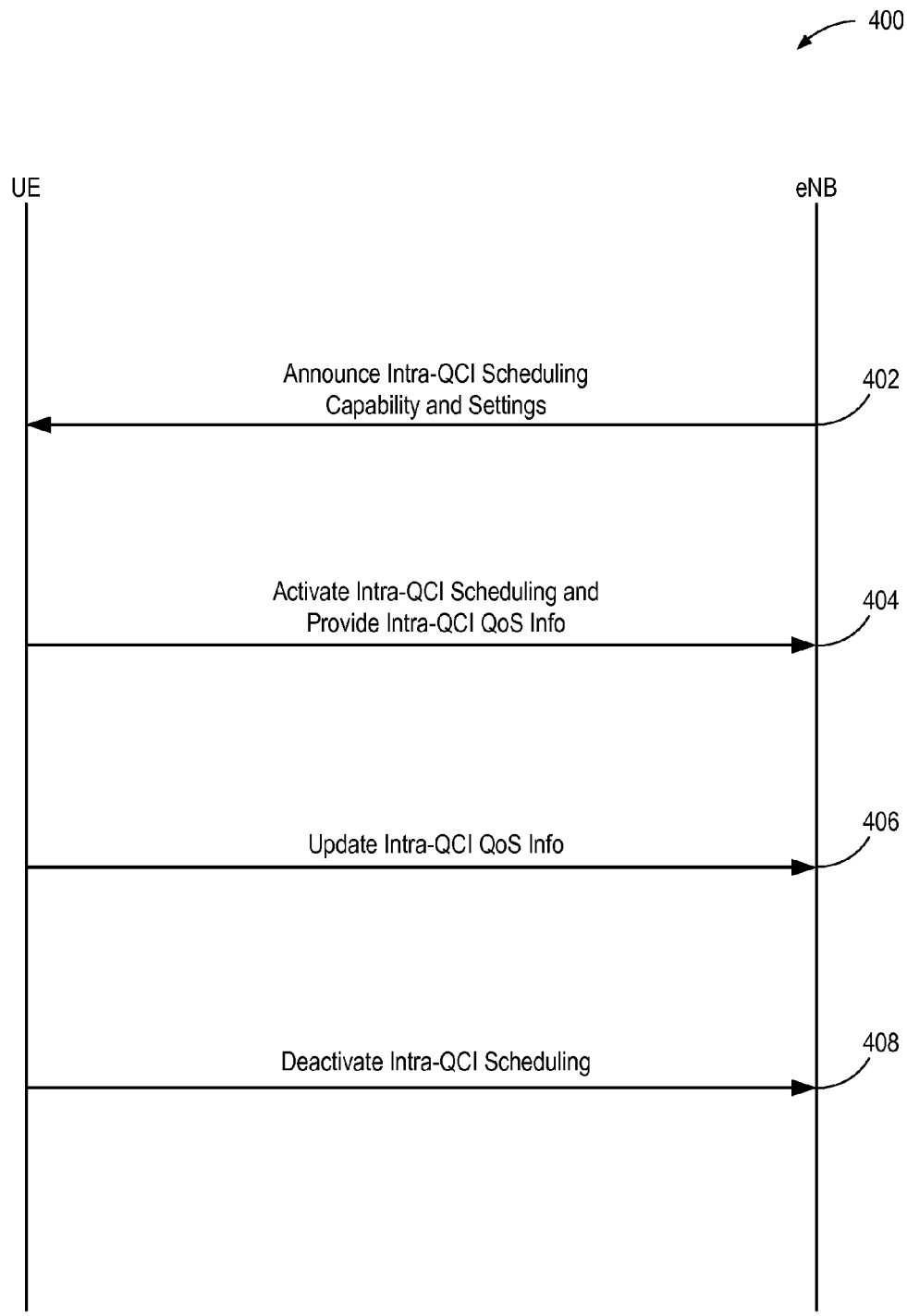
FIG. 4 is a schematic diagram of a plurality of communications between a UE and an eNB to establish and maintain intra-QCI QoS-aware scheduling.

FIG. 4 is a schematic diagram of a plurality of communications 400 between a UE and an eNB to establish and maintain intra-QCI QoS-aware scheduling. Not all UEs and/or eNBs may support intra-QCI QoS-aware scheduling. Accordingly, the eNB may announce 402 to the UE that it supports intra-QCI QoS-aware scheduling. The announcement may be broadcast to multiple UEs and/or transmitted to a single UE. The eNB may also, or instead, indicate settings, such as which settings can be set by the UE and which cannot and/or values for one or more settings. In some embodiments, the eNB may indicate a version of intra-QCI QoS-aware scheduling that is supported. The eNB may indicate the QCI(s) of the EPS bearer(s) for which intra-QCI QoS-aware scheduling will be supported. For example, the eNB may not allow intra-QCI QoS-aware scheduling in a default bearer for signaling messages and/or a dedicated bearer for voice but may allow intra-QCI QoS-aware scheduling in a default bearer for non-privileged subscribers and/or one or more other bearers. The UE may know from the eNB announcement for which bearers intra-QCI QoS-aware scheduling can be requested and for which it is unsupported.

If the UE would like the eNB to perform intra-QCI QoS-aware scheduling, the UE may transmit 404 an indication that the intra-QCI QoS-aware scheduling should be activated to the eNB. The UE may also provide intra-QCI QoS-aware scheduling information (e.g., the set of information 300), which may specify how the intra-QCI QoS-aware scheduling should be applied. For example, the intra-QCI QoS-aware scheduling information may include which traffic should be subject to the intra-QCI QoS-aware scheduling (e.g., which QCI, which traffic direction, etc.), how the traffic should be classified into flows, what QoS parameters should be applied to each flow, and/or the like. The intra-QCI QoS-aware scheduling information may be determined in part based on what information the eNB accepts, for example, as indicated in the announcement by the eNB. In an embodiment, the UE may perform intra-QCI QoS-aware scheduling for uplink traffic.

The eNB may transmit packets that have been scheduled according to the provided intra-QCI QoS-aware scheduling information to the UE and/or vice versa. The particular scheduling algorithm used by the eNB may not need to be specified in the intra-QCI QoS-aware scheduling information. For example, the eNB may select which scheduling algorithm to implement. Alternatively, or in addition, the UE may be able to indicate the scheduling algorithm. The applications running on the UE may change over time. Accordingly, the UE may want to change the intra-QCI QoS-aware scheduling and/or deactivate the intra-QCI QoS-aware scheduling. To change the intra-QCI QoS-aware scheduling, the UE may transmit 406 updated intra-QCI QoS-aware scheduling information, which may include information that has not changed and/or may only include information that has changed. The eNB and/or UE may transmit packets scheduled according to the updated intra-QCI QoS-aware scheduling information. To deactivate the intra-QCI QoS-aware scheduling, the UE may indicate 408 to the eNB that the intra-QCI QoS-aware scheduling should be deactivated. The UE may indicate that certain flows should be deactivated, that certain QCI should have the intra-QCI QoS-aware scheduling deactivated, and/or that all intra-QCI QoS-aware scheduling should be deactivated. The eNB and/or UE may use a default scheduling algorithm, which may treat intra-QCI traffic equally, in response to the intra-QCI QoS-aware scheduling being deactivated.

Figure 5:
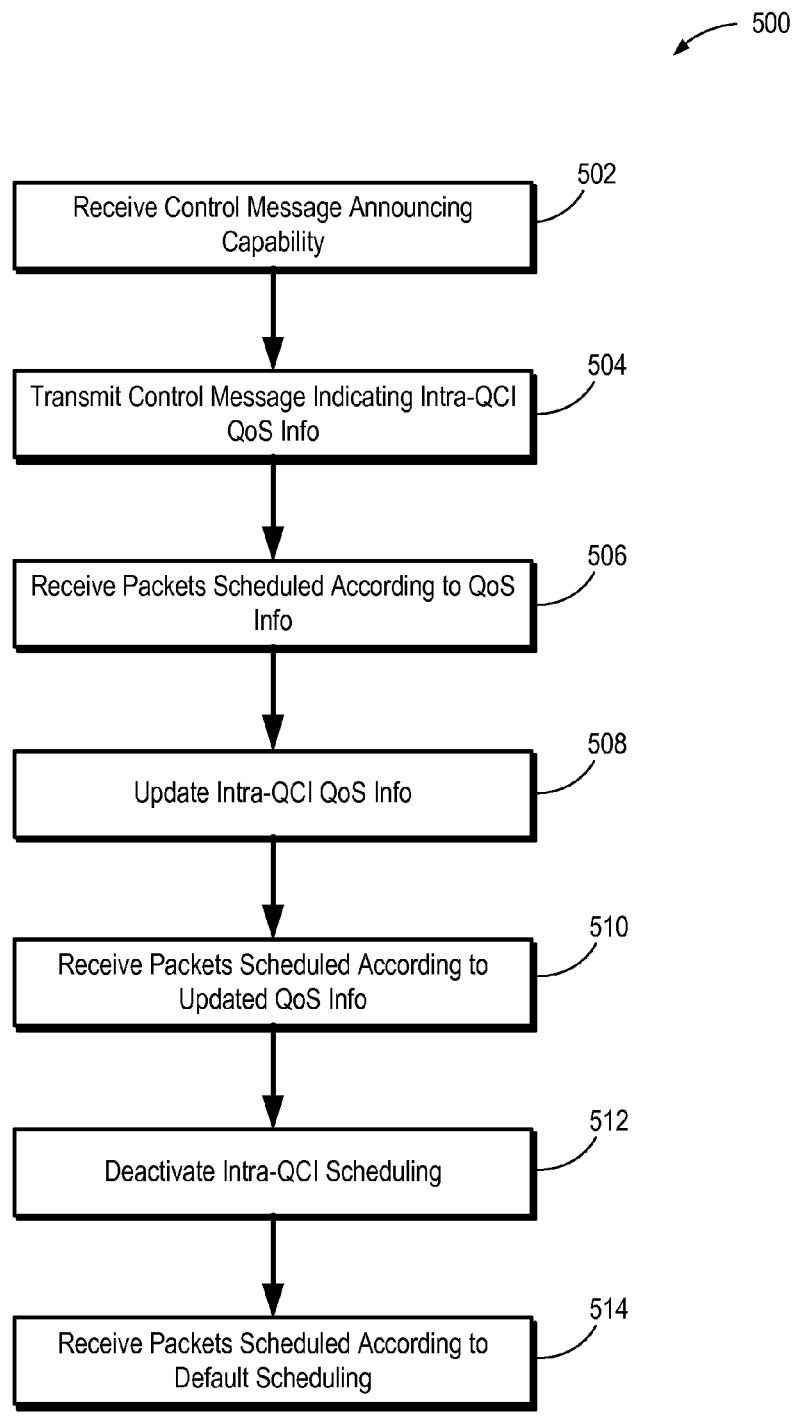
FIG. 5 is a flow diagram of a method for establishing, updating, and deactivating intra-QCI QoS-aware scheduling on a remote device.

FIG. 5 is a flow diagram of a method 500 for establishing, updating, and deactivating intra-QCI QoS-aware scheduling on a remote device. The method 500 may begin when a communicative coupling is being established with a radio network (e.g., a radio network including a remote device, such as an eNB). During or after establishment of the communicative coupling, a control message may be received 502 that announces capabilities of the remote device for providing intra-QCI QoS-aware scheduling. The control message may include any information necessary for intra-QCI QoS-aware scheduling to be activated, such as settings, version information, and/or the like.

To activate intra-QCI QoS-aware scheduling, a control message that indicates intra-QCI QoS-aware scheduling should be activated may be transmitted 504 to the remote device. The control message may include intra-QCI QoS-aware scheduling information indicating how the remote device should set up the intra-QCI QoS-aware scheduling. The intra-QCI QoS-aware scheduling information may be determined from predetermined specifications for one or more running applications, from traffic history from the one or more running applications, and/or the like. Packets that have been scheduled according to the intra-QCI QoS-aware scheduling information may be received 506 from and/or transmitted to the remote device. User experience with the one or more running applications may be improved based on the intra-QCI QoS-aware scheduling performed on the received packets. Alternatively, or in addition, packets may be transmitted to the remote device for scheduling.

Over time, which applications are running may change and/or the scheduling needs of the applications may change. The intra-QCI QoS-aware scheduling information may be updated 508 with the remote device, for example, by transmitting a control message indicating the updates and/or providing new, complete intra-QCI QoS-aware scheduling information. Additional packets that have been scheduled according to the updated intra-QCI QoS-aware scheduling information may be received 510 from and/or transmitted to the remote device.

It may also be desirable to deactivate the intra-QCI QoS-aware scheduling, for example, when it is no longer needed and/or one or more applications have been closed. The intra-QCI QoS-aware scheduling may be deactivated 512 with the remote device. In an embodiment, a control message indicating the intra-QCI QoS-aware scheduling should be deactivated may be transmitted to the remote device. Still additional packets, which may have been scheduled according to a default scheduling algorithm, may be received 514 and/or transmitted. The default scheduling algorithm may be an algorithm applied when the intra-QCI QoS-aware scheduling is not active and may treat traffic within a same QCI equally. One or more actions in the method 500 may be repeated and/or the actions may be performed in an order other than that shown in the illustrated embodiment. The method may end when a communicative coupling with the radio network is ended.

Figure 6:
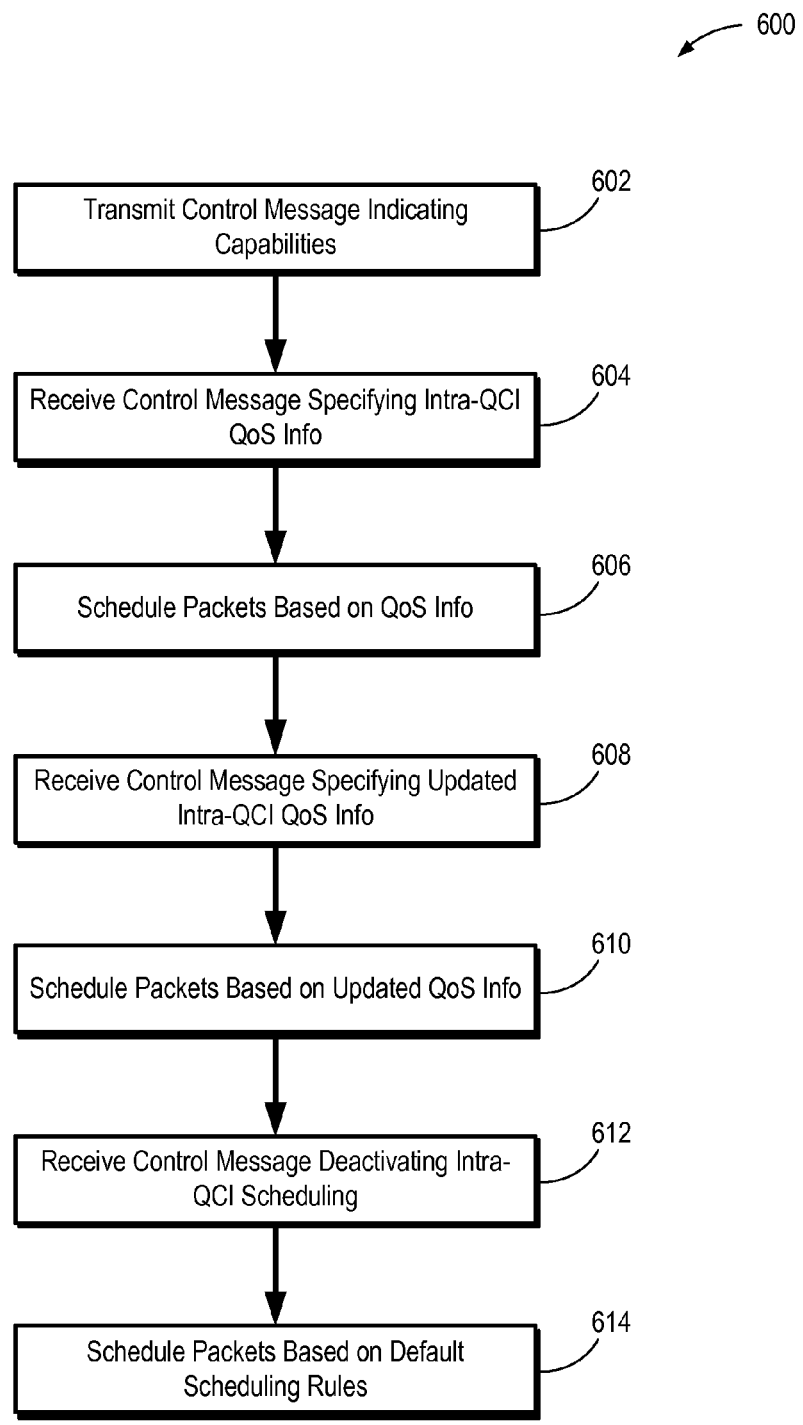
FIG. 6 is a flow diagram of a method for establishing, updating, and deactivating intra-QCI QoS-aware scheduling as directed by a remote device.

FIG. 6 is a flow diagram of a method 600 for establishing, updating, and deactivating intra-QCI QoS-aware scheduling as directed by a mobile user device. The method 600 may begin when a communicative coupling is being established with a mobile user device (e.g., a UE). During or after establishment of the communicative coupling, a control message may be transmitted 602 to the mobile user device. The control message may indicate intra-QCI QoS-aware scheduling capabilities that can be provided for the communicative coupling. The control message may indicate information that should be provided by the mobile user device to activate the intra-QCI QoS-aware scheduling. The information may include settings that should be provided, version information, and/or the like.

A control message may be received 604 from the mobile user device. The control message may indicate that intra-QCI QoS-aware scheduling should be activated. The control message may include intra-QCI QoS-aware scheduling information, which may indicate the mobile user device's scheduling preferences (e.g., how the mobile user device would like traffic prioritized). For example, the intra-QCI QoS-aware scheduling information may include information for classifying packets into flow, information on relative priority of flows, QoS parameters for each flow, and/or the like. Packets to and/or from the mobile user device may be scheduled 606 according to the intra-QCI QoS-aware scheduling information received from the mobile user device. In some embodiments, the mobile user device may not select the particular scheduling algorithm that is used to schedule packets. Rather, the mobile user device may indicate parameters from which the scheduling algorithm can determine the relative important of packets (e.g., determine which packets to prioritize and which to delay and/or drop). The scheduled packets may be transmitted to the mobile user device and/or may be received from the mobile user device for, e.g., transmission to the Internet.

Control messages specifying updated intra-QCI QoS-aware scheduling information may be occasionally and/or periodically received 608 from the mobile user device. For example, classification information, relative priorities of flows, QoS parameters for a flow, and/or the like may be updated. The updated intra-QCI QoS-aware scheduling information may include only the information to be updated and/or may include a complete set of intra-QCI QoS-aware scheduling information. Additional packets may be scheduled 610 based on the updated intra-QCI QoS-aware scheduling information. For example, the scheduling algorithm may update the parameters used to determine how to schedule packets. The additional packets may be transmitted to the mobile user device and/or the Internet after scheduling.

A control message indicating that intra-QCI QoS-aware scheduling should be deactivated 612 may be received from the mobile user device. The control message may indicate that all intra-QCI QoS aware scheduling should be deactivated, that scheduling should be deactivated for a QCI, that scheduling should be deactivated for a flow, and/or the like. In response, intra-QCI QoS-aware scheduling may be deactivated. After the intra-QCI QoS-aware scheduling is deactivated, still additional packets may be scheduled 614 but using default scheduling rules. The default scheduling rules may treat traffic within a same QCI equally and may apply common QoS parameters to all packets within the same QCI. One or more actions in the method 600 may be repeated and/or the actions may be performed in an order other than that shown in the illustrated embodiment. The method may end when a communicative coupling with the mobile user device ends.

Figure 7:
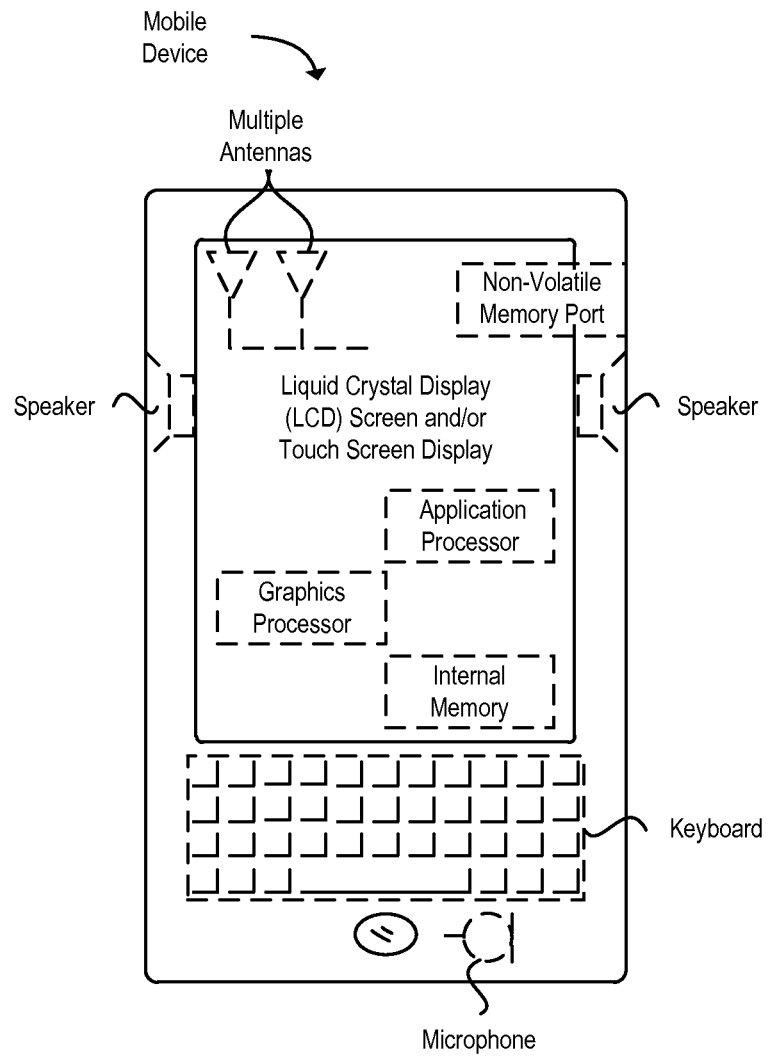
FIG. 7 is a schematic diagram of a UE able to support intra-QCI QoS-aware radio resource allocation.

FIG. 7 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments:

Example 1 is a UE configured to communicate with an E-UTRAN. The UE includes a processor and a memory coupled with the processor. The memory stores instructions, which when executed by the processor, cause the UE to receive a first RRC message from an eNB indicating that the eNB supports intra-QCI scheduling. The instructions, when executed by the processor, also cause the UE to transmit a second RRC message to the eNB indicating intra-QCI scheduling should be activated. The second RRC message indicates a number of flows for classifying traffic and QoS parameters for each flow. The instructions, when executed by the processor, also cause the UE to transmit and receive data. A plurality of packets is scheduled based on the QoS parameters. The plurality of packets includes at least a portion of the data.

In Example 2, the second RRC message of Example 1 includes an indication of a QCI to which the intra-QCI scheduling should be applied.

In Example 3, the second RRC message of any of Examples 1-2 includes an indication of a priority of each QoS parameter. The plurality of packets is scheduled based on the priority of each QoS parameter.

In Example 4, the second RRC message of any of Examples 1-3 includes an indication of a traffic direction to which scheduling should be applied, and wherein the plurality of packets scheduled were communicated in the traffic direction.

In Example 5, the second RRC message of any of Examples 1-4 includes classification information and an indication of a priority of each flow, wherein the classification information is used for classifying the traffic into the flows, and wherein the plurality of packets is scheduled based on the priority of each flow.

In Example 6, the instructions of any of Examples 1-5 when executed by the processor, cause the UE to transmit a third message to the eNB updating one or more of the QoS parameters.

In Example 7, the instructions of any of Examples 1-6 when executed by the processor, cause the UE to transmit a third message to the eNB indicating the intra-QCI scheduling should be deactivated.

In Example 8, the UE of any of Examples 1-7 includes a transceiver including transmitter and receiver components, multiple antennas, in which a first antenna of the multiple antennas is coupled to the transmitter, and in which a second antenna of the multiple antennas is coupled to the receiver, a display touchscreen, and a keyboard.

Example 9 is a method for supporting intra-QCI resource allocation. The method includes receiving, at a base station, a control message from a mobile user device. The control message from the mobile user device indicates intra-QCI resource allocation should be activated. The control message from the mobile user device includes an indication of a QCI to which intra-QCI resource allocation should be applied, classification information for a plurality of flows in the QCI, and QoS parameters for each flow. The method includes the base station identifying in which of the plurality of flows to classify each of a plurality of packets based on the classification information. The method includes scheduling the plurality of packets based on the QoS parameters and in which flow each packet was classified.

In Example 10, the method of Example 9 includes transmitting, by the base station, a control message to the mobile user device, wherein the control message to the mobile user device indicates that the base station supports intra-QCI resource allocation.

In Example 11, the control message from the mobile user device of any of Examples 9-10 includes a priority for each QoS parameter. Scheduling the plurality of packets includes attempting to satisfy a highest priority QoS parameter first and attempting to satisfy a lowest priority QoS parameter last.

In Example 12, the scheduling of any of Examples 9-11 includes satisfying the highest priority QoS parameter without satisfying the lowest priority QoS parameter.

In Example 13, the control message from the mobile user device of any of Examples 9-12 includes an indication of a priority of each flow. Scheduling the plurality of packets includes prioritizing packets in high priority flows.

In Example 14, the control message from the mobile user device of any of Examples 9-13 includes an indication of a traffic direction, and the plurality of packets being scheduled is travelling in the traffic direction.

In Example 15, the method of any of Examples 9-14 includes receiving an additional control message. The additional control message includes updated classification information for a plurality of updated flows. The method includes identifying in which of the plurality of updated flows to classify a plurality of additional packets.

In Example 16, the method of any of Examples 9-15 includes receiving an additional control message. The additional control message includes updated QoS parameters for each flow. The method includes scheduling a plurality of additional packets based on the updated QoS parameters.

In Example 17, the method of any of Examples 9-16 includes receiving an additional control message. The additional control message indicates intra-QCI resource allocation should be deactivated. The method includes scheduling a plurality of additional packets according to a default scheduling algorithm.

Example 18 is a device for establishing intra-class scheduling. The device includes a local radio configured to indicate to a remote radio that traffic in a predefined class should be divided into a plurality of subgroups and scheduled based on subgroup. The local radio configured to indicate to the remote radio criteria for dividing the traffic into the plurality of subgroups. The local radio configured to receive a plurality of messages divided into the plurality of subgroups and scheduled based on subgroup. The plurality of messages are received from the remote radio.

In Example 19, the local radio of Example 18 is configured to indicate to the remote radio one or more scheduling parameters for each subgroup. The plurality of messages are scheduled based on the one or more scheduling parameters for each subgroup.

In Example 20, the local radio of any of Examples 18-19 is configured to indicate criteria for dividing the traffic into the plurality of subgroups. The criteria includes identifying information from an internet protocol suite protocol.

In Example 21, the local radio of any of Examples 18-20 is configured to indicate a priority for each subgroup. The plurality of messages are scheduled based on the priority for each subgroup.

In Example 22, a radio access network comprises the remote radio of any of Examples 18-21.

In Example 23, the local radio of any of Examples 18-22 is configured to divide a plurality of uplink messages into the plurality of subgroups and schedule the uplink messages for transmission based on subgroup.

Example 24 is a method for supporting intra-QCI resource allocation when communicating with an eUTRAN. The method includes receiving, at a UE, a first RRC message from an eNB indicating that the eNB supports intra-QCI scheduling. The method includes transmitting, by the UE, a second RRC message to the eNB indicating intra-QCI scheduling should be activated. The second RRC message indicates a number of flows for classifying traffic and QoS parameters for each flow. The method includes transmitting and receiving data. A plurality of packets is scheduled based on the QoS parameters. The plurality of packets includes at least a portion of the data.

In Example 25, the second RRC message of Example 24 includes an indication of a QCI to which the intra-QCI scheduling should be applied.

In Example 26, the second RRC message of any of Examples 24-25 includes an indication of a priority of each QoS parameter. The plurality of packets is scheduled based on the priority of each QoS parameter.

In Example 27, the second RRC message of any of Examples 24-26 includes an indication of a traffic direction to which scheduling should be applied. The plurality of packets scheduled were communicated in the traffic direction.

In Example 28, the second RRC message of any of Examples 24-27 includes classification information and an indication of a priority of each flow. The classification information is used for classifying the traffic into the flows. The plurality of packets is scheduled based on the priority of each flow.

In Example 29, the method of any of Examples 24-28 includes transmitting a third message to the eNB updating one or more of the QoS parameters.

In Example 30, the method of any of Examples 24-29 includes transmitting a fourth message to the eNB indicating the intra-QCI scheduling should be deactivated.

Example 31 is a method for supporting intra-QCI resource allocation. The method includes receiving, at a base station, a control message from a mobile user device. The control message from the mobile user device indicates intra-QCI resource allocation should be activated. The control message from the mobile user device includes an indication of a QCI to which intra-QCI resource allocation should be applied, classification information for a plurality of flows in the QCI, and QoS parameters for each flow. The method includes the base station identifying in which of the plurality of flows to classify each of a plurality of packets based on the classification information. The method includes scheduling the plurality of packets based on the QoS parameters and in which flow each packet was classified.

In Example 32, the method of Example 31 includes transmitting, by the base station, a control message to the mobile user device. The control message to the mobile user device indicates that the base station supports intra-QCI resource allocation;

In Example 33, the control message from the mobile user device of any of Examples 31-32 includes a priority for each QoS parameter. Scheduling the plurality of packets includes attempting to satisfy a highest priority QoS parameter first and attempting to satisfy a lowest priority QoS parameter last.

In Example 34, the scheduling of any of Examples 31-33 includes satisfying the highest priority QoS parameter without satisfying the lowest priority QoS parameter.

In Example 35, the control message from the mobile user device of any of Examples 31-34 includes an indication of a priority of each flow. Scheduling the plurality of packets includes prioritizing packets in high priority flows.

In Example 36, the control message from the mobile user device of any of Examples 31-35 includes an indication of a traffic direction, and the plurality of packets being scheduled is travelling in the traffic direction.

Example 37 is an apparatus including means to perform a method as described in any of Examples 24-36.

Example 38 is a machine readable storage including machine-readable instructions, which when executed, implement a method or realize an apparatus as described in any of Examples 24-37.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium, wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present application should, therefore, be determined only by the following claims.

The invention claimed is:

1. User equipment (UE) configured to communicate with an evolved universal terrestrial radio access network (eUTRAN), the UE comprising:
a processor; and
a memory coupled with the processor, the memory storing instructions which when executed by the processor cause the UE to:
receive a first Radio Resource Control (RRC) message from an eUTRAN Node B (eNB) indicating that the eNB supports intra-Quality of Service (QoS) Class Identifier (QCI) scheduling, and indicating QCIs of bearers for which the intra-QCI scheduling may be requested by the UE;

responsive to the first RRC message indicating that the eNB supports the intra-QCI scheduling, determine to activate the intra-QCI scheduling with a second RRC message;

select at least one bearer from the bearers indicated by the first RRC message;

select a number of flows for classifying traffic within the at least one selected bearer, and QoS parameters for each one of the flows;

transmit the second RRC message to the eNB indicating that the intra-QCI scheduling should be activated, wherein the second RRC message indicates a QCI of the selected at least one bearer, the number of flows for classifying traffic, and the QoS parameters for each one of the flows; and transmit and receive data, wherein a plurality of packets is scheduled based on the QoS parameters, and wherein the plurality of packets comprises at least a portion of the data.

2. The UE of claim 1, wherein the first RRC message comprises an indication of what versions of intra-QCI scheduling is supported by the eNB.

3. The UE of claim 1, wherein the second RRC message comprises an indication of a priority of each QoS parameter, and wherein the plurality of packets is scheduled based on the priority of each QoS parameter.

4. The UE of claim 1, wherein the second RRC message comprises an indication of a traffic direction to which scheduling should be applied, and wherein the plurality of packets scheduled were communicated in the traffic direction.

5. The UE of claim 1, wherein the second RRC message comprises classification information and an indication of a priority of each flow, wherein the classification information is used for classifying the traffic into the flows, and wherein the plurality of packets is scheduled based on the priority of each flow.

6. The UE of claim 1, wherein the instructions, when executed by the processor, cause the UE to transmit a third message to the eNB updating one or more of the QoS parameters.

7. The UE of claim 1, wherein the instructions, when executed by the processor, cause the UE to transmit a third message to the eNB indicating the intra-QCI scheduling should be deactivated.

8. The UE of claim 1, further comprising:
a transceiver including transmitter and receiver components;
multiple antennas, in which a first antenna of the multiple antennas is coupled to the transmitter, and in which a second antenna of the multiple antennas is coupled to the receiver;
a display touchscreen; and
a keyboard.

9. A method for supporting intra-Quality of Service (QoS) Class Identifier (QCI) resource allocation, the method comprising:
transmitting, from a base station to a mobile user device, a first control message to indicate that the base station supports intra-QCI resource allocation, and to indicate QCIs of bearers for which the intra-QCI resource allocation may be requested by the mobile user device;
in response to the first control message, receiving, at the base station, a second control message from the mobile user device, wherein the second control message from the mobile user device indicates that the mobile user device determined that the intra-QCI resource allocation should be activated, and wherein the second control message from the mobile user device comprises:
an indication of at least one QCI, selected by the mobile user device from among the QCIs indicated by the first control message, to which intra-QCI resource allocation should be applied,
classification information for a plurality of flows in the at least one QCI, the classification information and the plurality of flows selected by the mobile user device, and
QoS parameters selected by the mobile user device for each flow;
the base station identifying in which of the plurality of flows to classify each of a plurality of packets based on the classification information; and
scheduling the plurality of packets based on the QoS parameters and in which flow each packet was classified.

10. The method of claim 9, wherein the second control message from the mobile user device further comprises a priority for each QoS parameter, and wherein scheduling the plurality of packets comprises attempting to satisfy a highest priority QoS parameter first and attempting to satisfy a lowest priority QoS parameter last.

11. The method of claim 10, wherein scheduling comprises satisfying the highest priority QoS parameter without satisfying the lowest priority QoS parameter.

12. The method of claim 9, wherein the second control message from the mobile user device comprises an indication of a priority of each flow, and wherein scheduling the plurality of packets comprises prioritizing packets in high priority flows.

13. The method of claim 9, wherein the second control message from the mobile user device comprises an indication of a traffic direction, and wherein the plurality of packets being scheduled is travelling in the traffic direction.

14. The method of claim 9, further comprising receiving an additional control message, wherein the additional control message comprises updated classification information for a plurality of updated flows, and wherein the method further comprises identifying in which of the plurality of updated flows to classify a plurality of additional packets.

15. The method of claim 9, further comprising receiving an additional control message, wherein the additional control message comprises updated QoS parameters for each flow, and wherein the method further comprises scheduling a plurality of additional packets based on the updated QoS parameters.

16. The method of claim 9, further comprising receiving an additional control message, wherein the additional control message indicates intra-QCI resource allocation should be deactivated, and wherein the method further comprises scheduling a plurality of additional packets according to a default scheduling algorithm.

17. A device for establishing intra-class scheduling, the device including an apparatus for a user equipment (UE) comprising:
a local radio configured to:
receive, from a remote radio of an evolved universal terrestrial radio access network (eUTRAN) Node B (eNB), a first signal comprising a first Radio Resource control (RRC) message indicating that the remote radio supports intra Quality of Service (QoS) Class Identifier (QCI) scheduling by dividing a predefined class into a plurality of subgroups and scheduling based on subgroup, the first signal indicating a plurality of predefined classes comprising QCIs of bearers for which the plurality of subgroups and scheduling based on subgroup may be requested by the local radio;

select at least one of the predefined classes that should be divided into the plurality of subgroups and scheduled based on subgroup;

determine criteria for dividing traffic into a plurality of subgroups by selecting at least one bearer from the bearers, and selecting a number of flows for classifying traffic within the at least one selected bearer;

in response to the first signal, determine to send one or more second signals comprising a second RRC message to:

indicate that the intra-QCI scheduling should be activated;

indicate to the remote radio that the traffic in the at least one of the predefined classes should be divided into the plurality of subgroups and scheduled based on subgroup as determined;

indicate to the remote radio the criteria for dividing the traffic into the plurality of subgroups; and indicate QoS parameters for each one of the flows; and receive a plurality of messages divided into the plurality of subgroups and scheduled based on subgroup, wherein the plurality of messages are received from the remote radio.

18. The device of claim 17, wherein the local radio is configured to indicate to the remote radio one or more scheduling parameters for each subgroup, and wherein the plurality of messages are scheduled based on the one or more scheduling parameters for each subgroup.

19. The device of claim 17, wherein the local radio is configured to indicate criteria for dividing the traffic into the plurality of subgroups, wherein the criteria comprises identifying information from an internet protocol suite protocol.

20. The device of claim 17, wherein the local radio is configured to indicate a priority for each subgroup, and wherein the plurality of messages are scheduled based on the priority for each subgroup.

21. The device of claim 17, wherein a radio access network comprises the remote radio.

22. The device of claim 17, wherein the local radio is configured to divide a plurality of uplink messages into the plurality of subgroups and schedule the uplink messages for transmission based on subgroup.

* * * * *